United States Patent [19]

Blackmer et al.

[11] 3,976,451
[45] Aug. 24, 1976

[54] VACUUM EXTRACT SYSTEM FOR A MEMBRANE OXYGEN ENRICHER

[75] Inventors: Richard H. Blackmer, Scotia; Jonathan W. Hedman, Burnt Hills, both of N.Y.

[73] Assignee: General Electric Company, Milwaukee, Wis.

[22] Filed: June 4, 1974

[21] Appl. No.: 476,260

[52] U.S. Cl. .................................. 55/158; 55/269
[51] Int. Cl.² ........................................ B01D 13/00
[58] Field of Search ................ 55/158, 16, 163, 21, 55/269

[56] References Cited
UNITED STATES PATENTS

| | | | |
|---|---|---|---|
| 3,251,652 | 5/1966 | Pfefferle | 55/16 X |
| 3,307,330 | 3/1967 | Niedzielski, et al. | 55/16 |
| 3,455,092 | 7/1969 | Llewellyn | 55/158 |
| 3,630,001 | 12/1971 | Hamerski | 55/158 |
| 3,638,401 | 2/1972 | Kabler | 55/158 |

OTHER PUBLICATIONS

Dyna Science Publication No. 2M671, 1971, p. 2.

*Primary Examiner*—Charles N. Hart
*Assistant Examiner*—Robert H. Spitzer
*Attorney, Agent, or Firm*—Thomas J. Bird; Granville M. Pine; Edward A. Hedman

[57] ABSTRACT

A mobile, personal oxygen enricher includes means for producing a flow of atmospheric air, heating the air to a pre-selected temperature, and directing the air over an array of selectively permeable membrane cells which permit the permeation of oxygen at a greater rate than nitrogen. Vacuum means maintain the cells at a partial vacuum and draw off oxygen enriched gas. The enriched gas passes through a scrubber to remove pollutants and is directed to a patient for inhalation.

17 Claims, 1 Drawing Figure

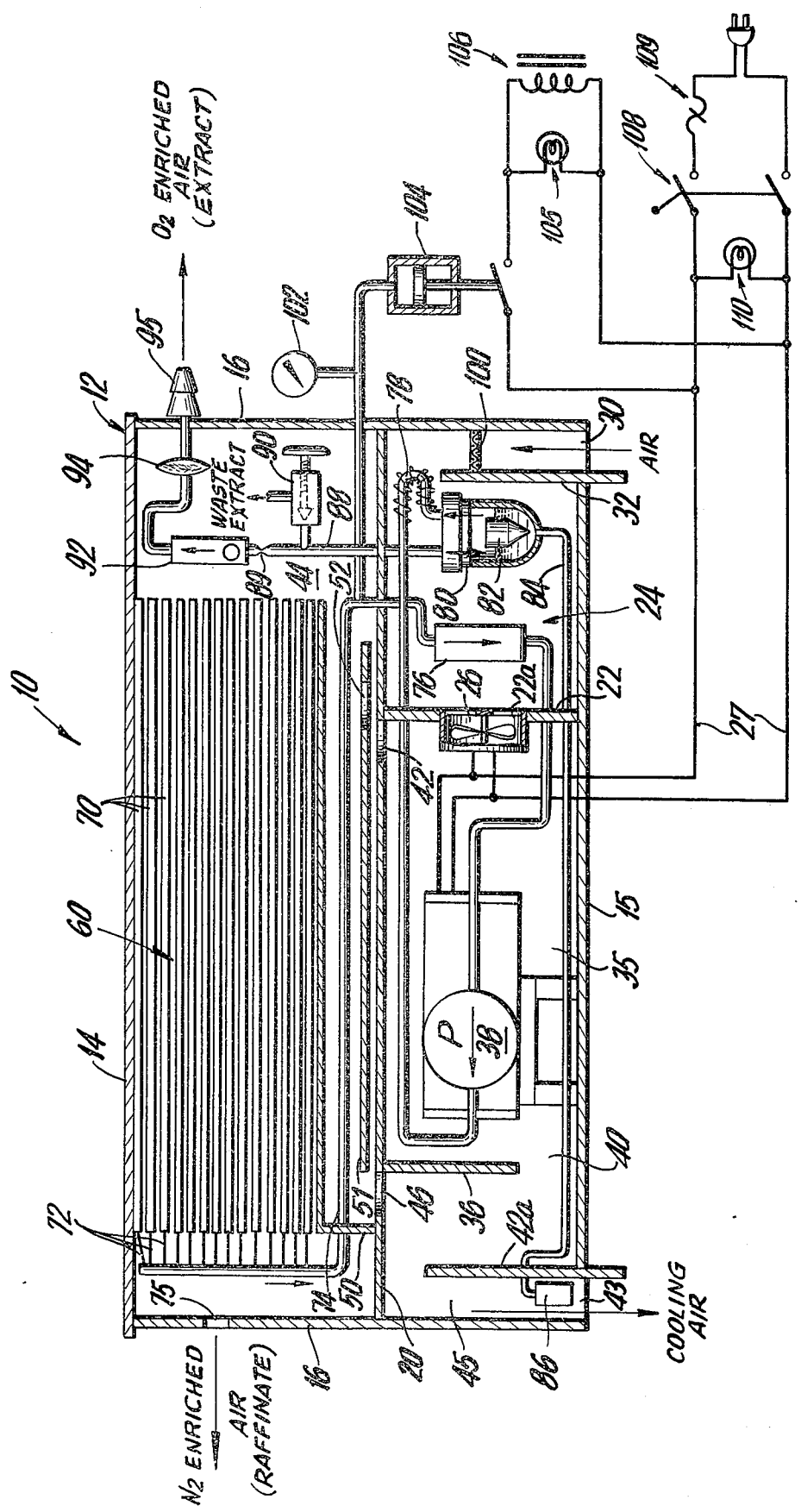

VACUUM EXTRACT SYSTEM FOR A MEMBRANE OXYGEN ENRICHER

BACKGROUND OF THE INVENTION

In the treatment of patients suffering respiratory ailments, such as emphysema where the patient's lung capacity is severely restricted, it is common practice to provide the patient with a source of oxygen. Typically, this source of oxygen is provided from a pressurized oxygen cylinder which may be located remotely from the patient in a hospital and supplied through suitable tubing (central storage type) or may be an individual cylinder located at the patient's bedside. Since many of these ailments are chronic and require extended therapy, portable oxygen cylinders which the patient may use at home have been developed.

While the use of individual cylinders provides the necessary life-sustaining therapy for these patients, the cylinders themselves present several problems when used in the home. Specifically, since these cylinders contain high pressure (2000 p.s.i.) oxygen, they present a constant danger of fire and explosion during use. The individual cylinders have limited capacity, and therefore must be serviced and replaced routinely thereby increasing the cost of therapy. In addition, there may also be leakage problems which may unexpectedly diminish the capacity of a cylinder so that the patient is left with inadequate therapy gas.

Atmospheric air, which contains about 21% oxygen and 78% nitrogen, provides a vast and abundant source of oxygen. However, until recently technology for extracting oxygen economically for individual use has been lacking. Now, however, membranes have been developed which are adapted to the feasible separation of gases.

As is well known to those skilled in the art, separation of gases in membrane technology is based on the selective permeability of certain materials. The term "selective permeability" means that one gas in a mixture will permeate through a membrane faster than a second gas, but this is not to suggest that one gas passes through the membrane to the complete exclusion of all others. Rather, a difference in the flow rate of two molecular species through a permeable membrane results so that the gas mixture on one side of the membrane is depleted in concentration of the more permeable component and the gas on the opposite side of the membrane is enriched with the more permeable component.

SUMMARY OF THE INVENTION

The present invention relates to gas separation by means of permeable films or membranes and more specifically to a portable, atmospheric air, oxygen enricher which is adapted for use in the hospital or in the patient's home.

The portable oxygen enricher includes an array of selectively permeable membrane cells which have a high permeability for oxygen relative to nitrogen. The membranes may be of several types including silicone rubber and polyphenylene ethers, the latter being preferred. The membrane cells are mounted in parallel spaced-apart relationship, and the interiors of the cells are manifolded to a vacuum source to provide a pressure differential across the cell membranes and to draw off gas which permeates through the cells. Atmospheric air at a controlled temperature is directed across the cells in parallel flow so that a portion of the flow permeates through the cell to provide oxygen enriched gas. Typically, about 15 s.c.f.m. of atmospheric air flows across the cells and 0.3 s.c.f.m. permeates through the cells to provide a gas enriched in oxygen to about 40%. The oxygen depleted gas, or raffinate, flows past the cell array and is exhausted to atmosphere.

The oxygen enriched gas drawn off by the vacuum means is passed through a scrubber to remove nitrogen dioxide and sulfur dioxide, which may also become enriched above atmospheric conditions by the membrane cells. Carbon monoxide is not enriched above ambient concentrations by membranes of polyphenylene ethers and particulate pollutants do not pass through the membranes.

The oxygen enriched and scrubbed gas is then cooled by the inlet air to the [apparatus] in a heat exchanger and water vapor enriched by the cells is removed by a self-emptying trap and evaporated in the cooling air exhaust from the apparatus. Enriched gas then passes through a control system and a bacterial filter to a face mask or other device for inhalation by the patient.

The oxygen enricher of the present invention provides a unit which produces enriched oxygen gas as needed by the patient without the inherent danger of stored oxygen gas cylinders. The enricher provides a source of enriched gas limited only by the availability of electric power and the component life of the apparatus which is well in excess of the storage capacity of individual cylinders thereby increasing the reliability and safety of the device as well as providing an economical source of oxygen for patient requiring prolonged respiratory therapy.

BRIEF DESCRIPTION OF THE DRAWING

The FIGURE is a schematic cross-sectional view illustrating an exemplary form of an oxygen enricher in accordance with the present invention.

DETAILED DESCRIPTION

While this invention is susceptible of embodiment in many different forms, there is shown in the drawing and will hereinafter be described in detail a preferred embodiment of the invention, with the understanding that the present disclosure is to be considered as an exemplification of the principles of the invention and is not intended to limit the invention to the embodiment illustrated.

The FIGURE illustrates an oxygen enricher 10 in which atmospheric air is passed over an array of selectively permeable membranes which permit oxygen to permeate therethrough at a greater rate than nitrogen to provide a flow of oxygen enriched gas. Enricher 10 includes a frame 12 having a generally rectangular cross-section defined by top member 14, bottom member 15, end wall members 16, and side wall members (not shown) to form an enclosed housing.

The internal space within housing 12 is divided horizontally by means of a horizontally disposed member 20 which extends between end walls 16. A transversely disposed wall member 22 extends downwardly from member 20 and cooperates therewith to form an intake structure 24. Wall member 22 is provided with an exhaust port 22a in which is positioned an axial fan 26. Fan 26 receives electrical power from power lines 27 to draw atmospheric air into intake structure 24 and through the enricher, as will be described below. An intake port 30 is provided in bottom member 15 and an upwardly extending wall member 32 which terminates below the lower surface of member 20, cooperates with the side wall members and right hand end wall member 16 to define an inverted L-shape flow path for directing atmospheric air into the intake structure.

Atmospheric air drawn through the intake structure by fan 26 passes into a second chamber or structure 35 adjacent the intake structure. Chamber 35 is defined by bottom and horizontal members 15 and 20, the side walls (not shown), wall member 22 at one end and a second vertical member 36 extending downwardly from member at the other end. Chamber 35 is designed to form an enclosure for a vacuum source 38, such as, a vacuum pump, which also receives power from lines 27.

Pump 38 is cooled by intake air flow which passes thereabout. The heated air coming from pump 38 is utilized to provide a means for controlling the temperature of the atmospheric air directed to the membranes. To this end, member 36 terminates at its lower end above the surface of bottom member 15 to provide a warm air outlet 40 through which heated air is exhausted from chamber 35. The temperature of the air feed to the cells is controlled by mixing the air warmed by pump 38 with cool intake air. To this end, member 20 defines a cool air outlet 42 adjacent fan 26 so that air entering chamber 35 may be short circuited through the cool air outlet into a flow chamber 44 which directs the flow of air to the membrane cell array 60. Warm air passing through port 40 is directed upwardly by means of a vertical wall 42a positioned in spaced-relationship from left hand wall 16. Wall 42a cooperates with bottom member 15, which is apertured at 43, to provide an exhaust channel 45 for the warm air. Horizontal member 20 defines a second port 46 between vertical members 36 and 42a to provide a means for venting warm outlet air into flow channel 44.

Flow channel 44 is defined by an L-shaped member 50 attached to the upper surface of horizontal member 20 and opening to the right, as viewed in the Figure, at a location spaced from cool air port 42 so that air in the channel is directed to array 60.

It has been found desirable to maintain the air delivered to the membrane array at about 95°F. To this end, a slidable valve plate 51 is positioned on the upper surface of horizontal member 20. Plate 51 includes a control port 52 adjacent the right hand end. Control port 52 is positioned in plate 51 so that, when the plate is moved to the extreme right position (complete warm air position), port 52 overlies and is blocked by member 20, and the left hand end of plate 51 is completely withdrawn from port 46 so that only warm air is directed to the array; and, when plate 51 is moved to an extreme left position (complete cool air position), port 46 is closed by the left hand end of the valve plate and port 52 is aligned with cool air port 42 so that only cool air intake is directed to the array. Valve plate 51 may be controlled manually or by thermal actuation for movement between the above extreme positions to maintain the temperature of the air directed to the membrane cells 60. Thus, at least a portion of the air drawn in by fan 26 is fed to the array and the remainder exhausted through port 43, and by proper utilization of the slide valve plate 51, the subflows through ports 42 and 46 provide feed air to the array at the desired temperature.

The array 60 of membrane cells is positioned between top member 14 and the upper surface of L-shaped member 50, which together form a flow channel for the array feed air, and includes a plurality of horizontally disposed, parallel, spaced-apart membrane cells 70. Cells 70 are interconnected by manifold means 72 to the intake of tubing 74 of vacuum pump 38. Membrane cells 70 may be of several types, including silicone rubber and polyphenylene ether. The membranes themselves can be obtained by techniques known to those skilled in the art. Since the present invention is designed for use as a source of enriched oxygen for inhalation therapy, the oxygen enriched gas should contain about 40% oxygen. For this level of enrichment membranes of polyphenylene ether are preferred. Preferably, each membrane cell has a permeation thickness in the order of about 1000 Angstroms or less.

Feed air is delivered to the array 60 by conduit 44 and passes over the array in parallel flow from right to left, as viewed in the Figure. Raffinate or oxygen depleted air exits through an exhaust port 75 in the left hand end wall 16. As the air passes over cells 70, a portion, less than 3%, of the total air flow permeates through the cells to provide an oxygen enriched gas having about 40% oxygen. The structure of each cell 70 includes a central support means which provides structural integrity for the cell and a means for directing oxygen enriched gas to the manifold means 72. The selectively permeable membrane is positioned on one surface of the support means so that each cell has one permeation surface. While the cells 70, also called fins, are shown as being flat and rectangular in shape, it will be appreciated that other shapes such as cylindrical may be utilized.

Vacuum pump 38 is designed to maintain the interior of each cell at 25 inches Hg vacuum when delivering 8 liters per minute of enriched gas at 30 inches Hg pressure absolute. In a test, run on one preferred array embodiment in which 40 cells were used, 5.3 liters per minute of 44.8% oxygen enriched air were produced.

As the oxygen enriched gas is drawn through tubing 74 it passes through a scrubber 76 positioned between the array and vacuum pump 38. Scrubber 26 is designed to lower the concentration of nitrogen dioxide and sulfur dioxide, which may become enriched due to their selective permeation in the membrane cells, to ambient concentration. After the enriched gas has been scrubbed, it passes through vacuum pump 38 and is then directed to an air fin heat exchanger 78 which is positioned within intake structure 24 so that the oxygen enriched gas is cooled by the intake air drawn by fan 26. Exchanger 78 is designed to cool the gas to within about 5°F of ambient temperature so that the patient receives the gas at about the same temperature as ambient air. After oxygen enriched gas has been cooled, it passes through a separator 80 which separates water vapor, which is enriched even more than oxygen by the membrane cells. Condensate is collected in the trap of separator 80 until the level of condensate opens float valve 82 allowing the water to escape through tubing 80 to a sponge or tray evaporator 86 positioned in exhaust channel 45.

Enriched gas passes from separator 80 through tubing 88 and is divided between a restricter 89 and an adjustable relief valve 90. It will be appreciated that the flow rate through restricter 89 is a function of the back pressure set by relief valve 90. The flow through restricter 89 is the flow to be directed to the patient and should be in the range of from about 4 to 8 liters per minute. The flow to the patient is measured by a flow meter 92.

The enricher gas passes through a bacterial filter 94 and then to a hose barb 95 which connects to an oxygen administration set including a mask or cannula worn by the patient. To prevent possible fouling of the enricher from suspended solids, a dust filter 100 is positioned in intake channel 30.

The performance of enricher 10 is monitored by a vacuum gauge 102 positioned in the intake line of vacuum pump 38. If a leak should develop in the membrane array or if the vacuum pump should fail to operate the pressure in line 74 will rise. This rise in pressure will be reflected on gauge 102 to provide an indication of limited leak condition. However, if unsafe limits or gross failure occurs, a pneumatically operated switch 104 connected to line 74, closes to actuate an alarm light 105 and buzzer 106 to provide both audial and visual warning to the patient.

Electrical power to the light and buzzer and lines 27 are provided to double pole switch 108 and circuit breaker 109. A pilot light 110 is also provided to give the patient a visual indication of power supply to the enricher.

The entire enricher is sized to be portable and light weight and may include casters so that it may be rolled from room to room in a patient's home. The power requirements are such that most ordinary household circuits may be utilized.

What is claimed is:

1. Apparatus for providing air enriched with oxygen comprising: an array of selectively permeable membrane cells, said cells being adapted to permit oxygen to permeate therethrough at a greater rate than nitrogen; means for developing a flow of atmospheric air; means for directing at least a portion of said flow across said array to develop permeation into said cells, said directing means including a chamber structure around said array to define a flow path for air about the membranes; means for maintaining a partial vacuum within said cells to draw off the oxygen enriched gas; conduit means operatively coupled with said cells and partial vacuum maintaining means for delivering said enriched gas for further use; and scrubber means in said conduit means for removing pollutants from said enriched gas.

2. Apparatus of claim 1, wherein said flow directing means includes means for dividing said flow into two subflows, heater means for heating one subflow to an elevated temperature; and mixing means adapted and arranged to combine pre-selected amounts of each of said subflows to provide said portion across the array, whereby the temperature of said portion directed to said cells is controlled by mixing heated and unheated atmospheric air.

3. Apparatus of claim 2, wherein said partial vacuum maintaining means includes a vacuum pump and said directing means further includes structure for passing subflow to be heated about said pump, said pump acting as said heater means as said subflow passes thereabout.

4. Apparatus of claim 1, further including heat exchanger means in said conduit delivery means, said exchanger means being adapted and arranged to lower the temperature of said enriched gas to a pre-selected usage temperature.

5. Apparatus of claim 4, wherein said heat exchanger means is arranged to lower said usage temperature to within 5°F of the ambient air temperature.

6. Apparatus of claim 4, including means located in said conduit delivery means downstream of said heat exchanger means for separating water vapor from said enriched gas.

7. Apparatus of claim 1, wherein said array comprises a plurality of membranes arranged in parallel spaced-apart relationship, and said directing means is arranged to direct said portion of flow across said membranes for parallel flow across said array.

8. Apparatus of claim 7, wherein said membranes are formed of a polyphenylene ether.

9. Apparatus of claim 8, wherein each of said membrane is about 1000 Angstroms or less in thickness.

10. Apparatus of claim 8, wherein said cell array is adapted to provide enriched gas having about 40% oxygen.

11. Apparatus for providing air enriched with oxygen comprising: frame means; an array of selectively permeable membrane cells within said frame means, said array having a plurality of cells arranged in parallel, spaced-apart relationship within a flow chamber defined by said frame means; said cells being adapted to permit oxygen to permeate therethrough at a greater rate than nitrogen; a closed air intake structure defined by said frame means; said structure including an air intake port and an air exhaust port; fan means positioned in said exhaust port and adapted to draw air therethrough from said intake port; a second structure adjacent said intake structure and adapted to receive air therefrom; a vacuum pump positioned in said second structure downstream of said exhaust port and operatively coupled to said array to develop a partial vacuum within said cells and draw off oxygen enriched gas therefrom, said second structure defining a cool air port adjacent said exhaust port and a warm air port downstream of said pump, a conduit open to said cool and warm air ports at one end and to the upstream end of said flow chamber at the other end; means operative with said cool and warm air ports for adjusting the flow of air therefrom, whereby the temperature of air delivered to said array is maintained at a pre-selected temperature; scrubber means interposed between said array and the intake of said pump for removing pollutants from the oxygen enriched gas; conduit means coupled to the output end of the pump and extending into said intake structure, an air fin heat exchanger in said conduit within said intake structure, said exchanger being cooled by the air drawn through said intake structure; separator means downstream of said heat exchanger for extracting water vapor from said enriched gas; a bacterial filter means downstream of said separator; and flow control means downstream of said filter means for controlling the flow of enriched gas for further use.

12. Apparatus of claim 11, wherein said membrane cells are formed of a polyphenylene ether.

13. Apparatus of claim 12, wherein each of said membrane is about 1000 Angstroms or less in thickness.

14. Apparatus of claim 12, wherein said cell array is adapted to provide enriched gas having about 40% oxygen.

15. Apparatus of claim 11, wherein said flow adjusting means includes a slidable valve plate.

16. Apparatus of claim 11, wherein said flow control means is adapted to deliver said enriched gas for further use at a rate in the range of about 4 to 8 liters per minute.

17. Apparatus for providing air enriched with oxygen comprising: an array of selectively permeable membrane cells, said cells being adapted to permit oxygen to permeate therethrough at a greater rate than nitrogen; means for developing a flow of atmospheric air; means for dividing said flow into two subflows; means for heating one of said subflows to an elevated temperature; mixing means adapted and arranged to combine pre-selected amounts of each of said subflows; means for directing the combined amounts across said array to develop permeation into the cells, said directing means including a chamber structure around said array to define a flow path for air about the membranes; means for maintaining a partial vacuum within said cells to draw off the oxygen enriched gas; and conduit means operatively coupled with said cells and partial vacuum maintaining means for delivering said enriched gas for further use.

* * * * *